United States Patent
Buennig et al.

(10) Patent No.: US 6,431,787 B1
(45) Date of Patent: Aug. 13, 2002

(54) DEVICE FOR FASTENING COMPONENTS

(75) Inventors: Torsten Buennig, Stuttgart; Frank Rahnfeld, Reichelsheim, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/720,606

(22) PCT Filed: Jun. 9, 1999

(86) PCT No.: PCT/DE99/01690
§ 371 (c)(1),
(2), (4) Date: Feb. 20, 2001

(87) PCT Pub. No.: WO00/01900
PCT Pub. Date: Jan. 13, 2000

(30) Foreign Application Priority Data

Jun. 30, 1998 (DE) .......................................... 198 29 181

(51) Int. Cl.[7] ................................. E04F 13/06

(52) U.S. Cl. .......................... 403/403; 403/375; 52/288

(58) Field of Search ................................ 403/401, 402, 403/403, 205, 231, 10, 375; 52/288.1, 656.1, 656.9

(56) References Cited

U.S. PATENT DOCUMENTS

| 4,104,839 A | * | 8/1978 | Balzer et al. ............... 52/288.1 |
| 4,161,853 A | * | 7/1979 | Weiss et al. ............... 52/288.1 |
| 4,258,515 A | * | 3/1981 | Owen .......................... 52/105 |
| 4,385,850 A | * | 5/1983 | Bobath ....................... 403/205 |
| 4,430,833 A | * | 2/1984 | Balzer et al. ................. 52/255 |

FOREIGN PATENT DOCUMENTS

| DE | 94 13 840 U1 | 11/1995 |
| DE | 296 07 236 U1 | 8/1996 |
| DE | 296 13 526 U1 | 1/1998 |
| DE | 196 34 322 A1 | 2/1998 |
| EP | 0 458 488 A | 11/1991 |
| GB | 2 290 846 A | 1/1996 |

* cited by examiner

Primary Examiner—Lynne H. Browne
Assistant Examiner—John R. Cottingham
(74) Attorney, Agent, or Firm—Michael J. Striker

(57) ABSTRACT

A device (10) for fastening components (11) has a mounting element (12), which rests each with a respective joining face (16) on the components (11) to be connected, and which is covered with a cap (14). The cap (14) has extensions (38), which positively engage recesses (30) embodied on the mounting element (12). This assures a secure hold of the cap (14) even after a relatively long time.

9 Claims, 1 Drawing Sheet

DEVICE FOR FASTENING COMPONENTS

PRIOR ART

The invention is based on a device for fastening components as generically defined by the preamble to claim 1. Devices previously used in practice have a mounting element that rests with joining faces on the components to be connected. Since the joining faces are connected to the component with the aid of screws, for instance, the screws protrude past the walls of the joining faces, and a user of the device could be injured as a result. For this reason, caps are placed on the mounting elements. As a rule, the caps are made of plastic and have one or pinlike extensions, which are inserted into fitting bores in the mounting elements, where they hold by means of a press fit. During use, because of material shrinkage of the plastic, especially in conjunction with severe vibration, the pins can slide out of the bores, and the caps can fall off the mounting elements.

Cover elements are also known that have elastic detent extensions that engage recesses on a component that is to be covered. In order to gain their elasticity, the detent extensions are thin elongated components. However, as a consequence, they can easily break off, especially when the cover elements are frequently put on and taken off.

ADVANTAGES OF THE INVENTION

The device for fastening components according to the invention having the characteristics of the body of the main claim has the advantage over the prior art that the cap holds durably on the mounting element and nevertheless is easy to install. Furthermore, fluctuations in tolerances, especially for the cap, can easily be compensated for.

As a result of a symmetrical embodiment of the mounting element and the cap, simple installation is assured, since there is no need to adhere to a certain orientation.

With the aid of recesses for releasing the cap from the installed mounting element, simple removal of the cap is provided for without scratching any parts.

If a contour of a side view of the device is equivalent to a quarter-circle, the advantageous result is a large covered space, which offers a great deal of room for fasteners.

By the provisions and characteristics recited in the dependent claims, particular refinements of the device defined by the main claim are described.

DRAWING

One exemplary embodiment of the invention is shown in the drawing and explained in further detail in the ensuing description.

DESCRIPTION OF THE EXEMPLARY EMBODIMENT

Figure 1:
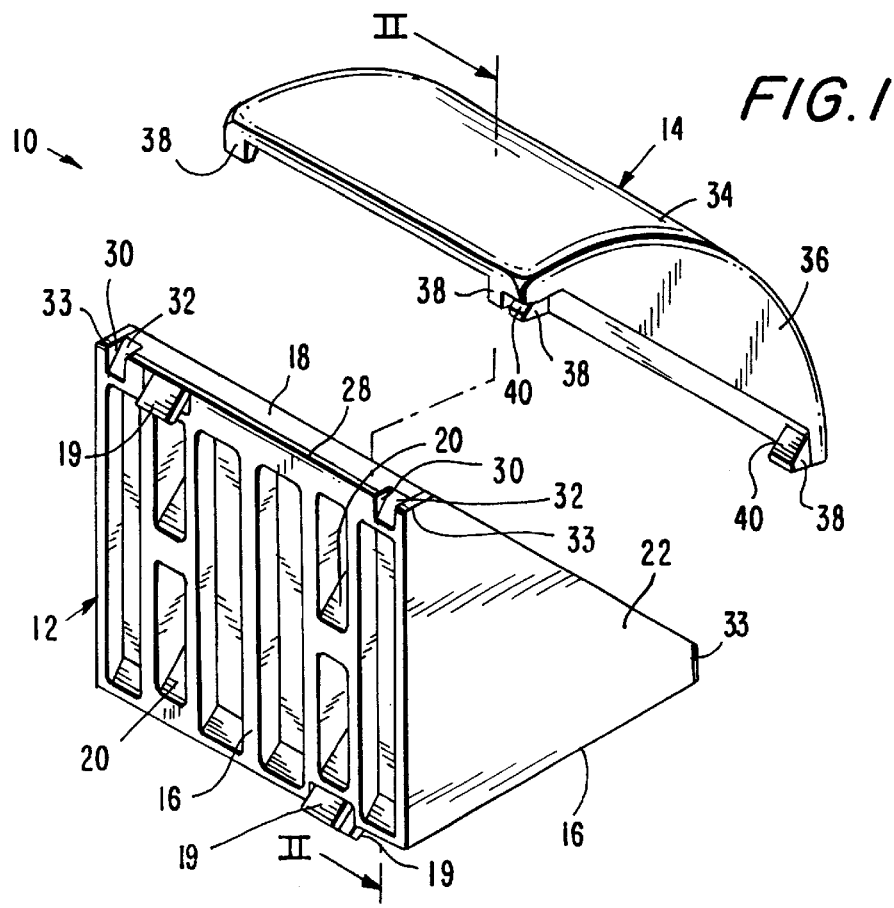
FIG. 1 is a perspective exploded view of the device.

A device 10 shown in FIG. 1 serves to fasten components 11, in particular profile bars with undercut longitudinal grooves, which are shown in simplified form in the drawing. The device 10 comprises both a mounting element 12 in the form of a profile angle, preferably a diecast part, which can be connected to the components 11, and a cap 14, advantageously embodied as a plastic injection-molded part.

The mounting element 12 has joining faces 16 for the components 11 to be connected; the joining faces are embodied on two walls 18 that are preferably at a right angle to one another. Protruding from each joining face 16 are two or more breakaway tongues 19, which can be made to engage undercut longitudinal grooves in profile bars and thus form a securing means to prevent relative rotation. In each wall 18, openings 20 are formed through which fasteners for the components 11, such as screws, can be passed. In the present exemplary embodiment, there are also webs 22 between the walls 18, to increase the mechanical strength of the mounting element 12. The walls 18 and the webs 22 form a recess 24, for which the cap 14 serves as a cover.

Figure 2:
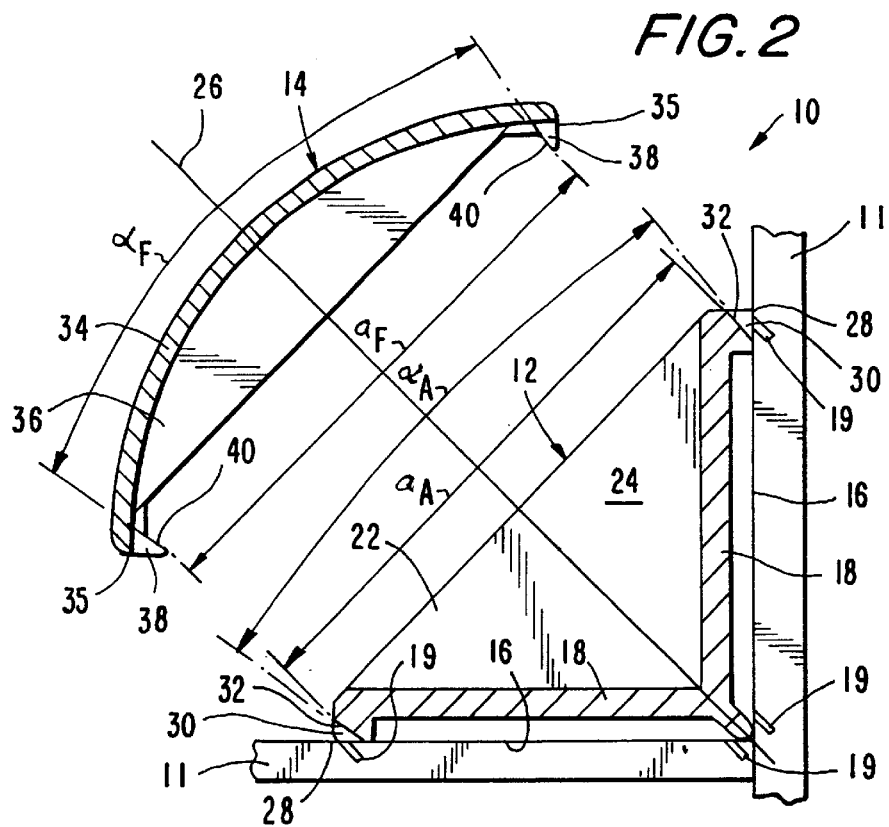
FIG. 2 is a sectional view taken along the line II—II of FIG. 1.

As seen from FIG. 2, a common plane 26 extends through both the mounting element 12 and the cap 14 and mirror-symmetrically divides the mounting element 12 and the cap 14. On two edges 28, pointing away from one another, of the joining faces 16, two recesses 30 per edge 28 are formed. That is, there are a total of four recesses 30. However, it is also possible to provide a total of only two recesses 30, or more than four of them. The recesses 30, which are opposite one another in pairs, have a spacing $a_A$, which is divided in half by the plane 26. The recesses 30 also have mounting faces 32, which form an angle $\alpha_A$, which in the present exemplary embodiment is advantageously 10°. The angle $\alpha_A$ is bisected by the plane 26. The spacing $a_A$ of the mounting faces 32 narrows as a result in the direction of the joining faces 16.

On at least one face end, toward the cap 14, of the webs 22 of the mounting element 12, at least one recess 33 is formed. In the exemplary embodiment, a total of four recesses 33 is provided.

For covering the mounting element 12, the cap 14 is used, which has one curved cover part 34 and two lateral webs 36. Because of this embodiment, the cap 14 becomes elastic and yet still remains quite stable. The cover part 34 extends from one edge, marked 28 in FIG. 2, of the mounting element 12 to the opposite edge, also marked 28. The webs 36 of the cap 14 are aligned with the webs 22 of the mounting element 12. As a result, the recess 24 of the mounting element 12 is covered completely. In a mounting element 12 without webs 22, the webs 36 of the cap 14 are shaped in such a way that the recess 24 is completely closed. It can also be seen from FIG. 2 that a contour of a side view of the device 10 is substantially equivalent to a quarter-circle. The result is advantageously a large covered space, which offers enough room for fasteners. However, it is also possible to provide a flat cover part 14, if the fasteners are correspondingly small.

On both sides of the aforementioned plane 26, on opposed edges 35, pointing away from one another, of the cover part 34, two extensions 38 are formed. The extensions 38 are small and compact, and as a result they are rigid relative to the cover part 34. A total of at least two extensions 38 should be formed onto the cap 14, but more than four extensions 38 are also possible. The extensions 38, which are opposite one another in pairs, have a spacing $a_F$. The spacing $a_F$ is bisected by the plane 26. The extensions 38 are embodied such that they cooperate with the recesses 30. To that end, the spacing $a_A$ of the recesses 30 is advantageously greater than the spacing $a_F$ of the extensions 38. The extensions 38 have a width that is dimensioned such that they fit into the recesses 30 with some play. The extensions 38 also have mounting faces 40, which form an angle $\alpha_F$, which in the present exemplary embodiment is advantageously 20°. The angle $\alpha_F$ is bisected by the plane 26. The spacing of the mounting faces 40 narrows as a result, as the spacing of the mounting faces 40 from the cap 14 increases.

In the mounting of the cap 14 on the mounting element 12, the latter already being firmly screwed to components 11, the extensions 38 of one edge 35 of the cover part 32 of the cap 14 are for instance inserted first into the recesses 30 of one edge 28 of the mounting element 12. Then the cap 14 is pressed against the face end of the webs 22 of the mounting element 12. As a result, the cap 14 bends open, and the extensions 38 of the other edge 35 of the cover part 32 of the cap 14 engage the inside of the recesses 30 of the mounting element 12. Since the spacing $a_A$ of the mounting faces 32 of the recesses 30 is greater than The spacing $a_F$ of the mounting faces 40 of the extensions 38, the cap 14 holds by positive engagement on the mounting element 12. Because the angle $\alpha_F$ of the mounting element 12 is greater than the angle $\alpha_F$ of the cap 14, the mounting faces 40 of the cap 14 slide along the mounting faces 32 of the mounting element 14, so that the cap 14 is pressed against the mounting element 12. The cap 14 finally, in the fully installed state, circumferentially grips the mounting element 12 with the aid of the extensions 38. As a result, an especially secure hold of the cap 14 on the mounting element 12 is assured.

The recesses 33 provided between the mounting element 12 and the cap 14 serve the purpose of simple release of the cap 14 from the installed mounting element 12. Once the mounting element 12 is fastened to the components 11 and the cap 14 has been mounted on the mounting element 12, the cap 14 can be removed again only with difficulty without the recesses 33, because the seams between the mounting element 12 and the cap 14 are very small and present no opportunity of placing a tool against them. Even with the fingers, the cap can be grasped only with difficulty. If a screwdriver is used, for instance, it can also happen that the mounting element 12 and/or the cap 14 will become scratched.

For removing the cap 14, the tip of a slot-type screwdriver is introduced into a recess 33 and pivoted, and the cap 14 is thus released from the mounting element 12. If necessary, one screwdriver or some other suitable device can also be employed from each side. The recesses 33 are accordingly devices that substantially facilitate removal of the cap 14. The recesses 33 can also be wedge-shaped, in which case a screwdriver need not be pivoted. The screwdriver lifts the cap 14 from the mounting element 12 solely by being gradually introduced.

The recesses 30 need not necessarily be embodied on edges 28 of the joining faces 16. It is also possible to provide them on other edges, for instance on the edges of the webs 22. The embodiment of the edges themselves makes it possible for the engaging extensions 38 to be made as small as possible. If structural conditions allow it, they can also be embodied at other locations.

The extensions 38 are small and compact compared to the cap 14, and as a result they are more rigid than the cap 14 and do not warp upon installation and removal. Upon installation and removal, accordingly only the cap 14 or the cover part 34 is deformed, but not the extensions 38. This eliminates the risk that the extensions 38 will break off because of the alternating stress during frequent installation and removal.

A further advantage of the invention should be mentioned at this point. Both the mounting element 12 and the cap 14, because of their embodiment, and especially the embodiment of the angles $\alpha_A$ of the mounting faces 32 of the recesses 30 and the angles $\alpha_F$ of the mounting faces 40 of the extensions 38, can be produced in tools without pushers, making inexpensive production possible.

What is claimed is:

1. A device (10) for fastening components (11), comprising a mounting element (12) with joining faces (16) for the components (11) and an elastic cap (14) for covering a recess (24) located between walls (18) of the joining faces (16), wherein at least two opposed recesses (30) are formed on the mounting element, said at least two opposed recesses having a first spacing ($a_A$), wherein at least two opposed extensions (38) are formed onto the cap (14), said at least two opposed extensions having a second spacing ($a_F$) and cooperating with said at least two opposed recesses (30), wherein the first spacing ($a_A$) of said at least two opposed recesses (30) being greater than the second spacing ($a_F$) of the at least two opposed extensions (38), wherein the at least two extensions (38) are rigid relative to the cap (14), wherein the cap (14) circumferentially grips the mounting element (12) with the aid of the extensions (38), said at least two opposed recesses having first mounting faces (32) between which a first angle ($\alpha_A$) is located, said first angle ($\alpha_A$) bisected by at least one plane (26), said at least two opposed extensions (38) having two mounting faces between which a second angle ($\alpha_F$) is located, wherein said second angle ($\alpha_F$) is bisected by said at least one plane (26), and wherein the first angle ($\alpha_A$) is greater than the second angle ($\alpha_F$).

2. The device (10) of claim 1, wherein said at least one plane (26) divides the cap (14) and the mounting element (12) mirror-symmetrically and extends through the cap (14) and the mounting element (12).

3. The device (10) of claim 2, wherein the second spacing ($a_F$) of the at least two opposed extensions (38) and the first spacing ($a_A$) of the at least two opposed recesses (30) are divided in half by the at least one plane (26).

4. The device (10) of claim 2, wherein two extensions (38) and two recesses (30) are disposed on each side of the at least one plane (26).

5. The device (10) of claim 1, wherein the at least two opposed recesses (30) are disposed on edges (28) of the mounting element (12).

6. The device (10) of claim 1, wherein the at least two opposed recesses (30) are disposed on edges (28), pointing away from one another, of the joining faces (16).

7. The device (10) of claim 1, wherein webs (22) are formed between the walls (18).

8. The device (10) of claim 1, wherein at least one recess (33) for releasing the cap (14) from the mounting element (12) is provided between the mounting element (12) and the cap (14).

9. The device (10) of claim 1, wherein a contour of a side view of the device (10) substantially corresponds to a quarter-circle.

* * * * *